(12) United States Patent
Grabau

(10) Patent No.: US 9,341,273 B2
(45) Date of Patent: May 17, 2016

(54) COMPOSITE DYNAMIC VALVE SEAL ASSEMBLY FOR HIGH TEMPERATURE CONTROL VALVES

(71) Applicant: FISHER CONTROLS INTERNATIONAL LLC, Marshalltown, IA (US)

(72) Inventor: Ted D. Grabau, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 14/208,168

(22) Filed: Mar. 13, 2014

(65) Prior Publication Data

US 2014/0264128 A1 Sep. 18, 2014

Related U.S. Application Data

(60) Provisional application No. 61/782,766, filed on Mar. 14, 2013.

(51) Int. Cl.
*F16K 3/26* (2006.01)
*F16K 3/24* (2006.01)
*F16J 9/28* (2006.01)
*F16J 15/56* (2006.01)

(52) U.S. Cl.
CPC . *F16K 3/267* (2013.01); *F16J 9/28* (2013.01); *F16J 15/56* (2013.01); *F16K 3/243* (2013.01)

(58) Field of Classification Search
CPC ....... F16K 3/267; F16K 3/243; F16K 25/005; F16J 15/56; F16J 9/28; F16J 15/186; F16J 15/3212

USPC ............... 251/324, 332, 368, 214; 137/625.3; 277/530, 539, 541, 589
See application file for complete search history.

(56) References Cited

U.S. PATENT DOCUMENTS

| | | | |
|---|---|---|---|
| 1,988,216 A * | 1/1935 | Ryan | 277/530 |
| 3,048,412 A | 8/1962 | Baker | |
| 3,463,450 A * | 8/1969 | Works | 251/309 |

(Continued)

FOREIGN PATENT DOCUMENTS

| | | |
|---|---|---|
| EP | 0 308 390 A1 | 3/1989 |
| EP | 1002975 A1 | 5/2000 |

(Continued)

OTHER PUBLICATIONS

Search Report for PCT/US2014/022246, mailed Jun. 2, 2014.

(Continued)

*Primary Examiner* — Marina Tietjen
(74) *Attorney, Agent, or Firm* — Marshall, Gerstein & Borun LLP

(57) ABSTRACT

A sliding stem control valve includes a valve body, a seat ring located within the valve body and a valve plug slidably mounted within the valve body, the valve plug and the valve seat cooperating to control fluid flow through the control valve. A composite seal assembly is located between the valve plug and the valve seat, the composite seal assembly includes a composite seal ring located between a first backup ring and a second backup ring. A biasing element is located adjacent the second backup ring and a retainer ring is located adjacent the biasing element to maintain the biasing element adjacent the second backup ring.

16 Claims, 2 Drawing Sheets

(56) References Cited

U.S. PATENT DOCUMENTS

| | | | |
|---|---|---|---|
| 4,451,047 A | 5/1984 | Herd et al. | |
| 4,798,634 A * | 1/1989 | McCune et al. | 148/325 |
| 7,963,502 B2 * | 6/2011 | Lovell et al. | 251/214 |
| 2002/0017327 A1 | 2/2002 | Kawaai et al. | |
| 2004/0011986 A1 | 1/2004 | Faramarzi | |
| 2008/0042369 A1 * | 2/2008 | Krywitsky et al. | 277/522 |
| 2009/0320931 A1 | 12/2009 | Wears | |
| 2010/0270491 A1 | 10/2010 | Faas | |
| 2013/0015383 A1 * | 1/2013 | Anderson et al. | 251/314 |

FOREIGN PATENT DOCUMENTS

| | | |
|---|---|---|
| FR | 2212897 A5 | 7/1974 |
| FR | 2859776 A1 | 3/2005 |
| GB | 2045388 A | 10/1980 |

OTHER PUBLICATIONS

Written Opinion for PCT/US2014/022246, mailed Jun. 2, 2014.
International Preliminary Report on Patentability for International application No. PCT/US2014/022246, dated Sep. 15, 2015.

* cited by examiner

COMPOSITE DYNAMIC VALVE SEAL ASSEMBLY FOR HIGH TEMPERATURE CONTROL VALVES

FIELD OF THE DISCLOSURE

The disclosure relates to process control valves, such as sliding stem valves, and more particularly to sliding stem control valves having a composite dynamic valve seal assembly for high temperature operations.

BACKGROUND

Process control valves are used in systems or processes that require regulation or control of process fluid flows. Such control valves may be configured as sliding stem valves, rotary valves, globe valves, etc. By setting a position of a control element, such as a valve plug, relative to a valve seat, fluid flow through the control valve may be precisely set. The valve plug slides or moves relative to the valve seat generally within a valve body. In some control valves, a cage may be included, the valve plug sliding within the cage. Because the valve plug slides within the valve body, preventing fluid flow between the valve plug and the valve body (or cage) is important. At the same time, reducing friction and minimizing wear and adhesion between the valve plug and the valve body (or cage) is desirable.

In some control valves, a seal may be incorporated into valve plug itself, or the seal may be incorporated into the valve body (or cage) or bonnet. Regardless, the seal must prevent fluid from flowing between the valve plug and the valve body or bonnet. In an effort to both prevent fluid from flowing between the control element and the valve body or bonnet, and to reduce friction generated between the control element and valve body or bonnet, some sliding stem valves have incorporated relatively soft materials into the seal. Such seals are spring loaded, pressure assisted lip seals constructed from neat, filled, or reinforced polytetrafluoroethylene jackets with a corrosion resistant spring constructed from stainless steel, nickel or cobalt based alloys. Other fluoropolymers, ultrahigh molecular polyethylene, and polyurethane are other jacket materials that are used. Other types of seals that have been used include synthetic o-rings, quad-rings, backup rings with PTFE based wear rings and metal reinforced PTFE based monolithic seals. While reducing friction and providing a high quality, resilient seal, soft materials are generally not useful in high temperature environments because the material may melt, creep, or otherwise degrade under high temperature conditions. All of these soft materials are only used for relatively low temperatures, less than 600° F. (less than about 316° C.).

Conventional high temperature sliding stem control valves have typically incorporated monolithic, hard graphite seal rings that can withstand high temperatures. While the graphite seal rings are able to withstand high temperatures, the graphite seal rings do not generally provide an optimum seal between the valve plug and the valve body (or cage) or bonnet because they are not flexible, compliant, or resilient. Graphite seal rings may be damaged from friction created between the valve plug and the valve body (or cage) and they are relatively vulnerable to particles and contaminants in the flow stream particles or contaminants that have adhered to the valve plug or valve body (or cage). The lack of compliance in monolithic graphite materials results in significantly more shutoff leakage than the softer rubber or plastic compliant materials that are employed in low temperature environments. Additionally, graphite seal rings have relatively high coefficients of friction, which leads to excess friction and wear when the valve plug is moved. This excess friction and wear leads to degradation and early failure of the seal and/or the control element.

SUMMARY

A sliding stem control valve includes a valve body having an inlet and an outlet. The inlet and outlet are fluidly connected by a fluid flow passageway. A valve seat is located in the fluid flow passageway. A slidable control element cooperates with the valve seat to control fluid flow through the valve body. A seal assembly is located between the control element and the valve body. The seal assembly includes a composite seal ring located between a first backup ring and a second backup ring. A biasing element is located adjacent one of the backup rings and a retainer ring maintains the biasing element adjacent the backup ring so that force generated by the biasing element is transferred to the backup ring and thus to the composite sealing ring.

In another embodiment, a seal assembly for a high temperature sliding stem control valve includes a composite seal ring that is located between a first backup ring and a second backup ring. A biasing element is located adjacent the second backup ring and a retainer ring is located adjacent the biasing element. The composite seal ring may be made of PTFE and metal.

In yet another embodiment, the seal ring assembly may be located in an annular recess formed in the control member.

In yet another embodiment, the seal ring assembly may be located in an annular recess formed in the valve body.

The disclosed seal ring assembly provides superior sealing capabilities in high temperature environments while reducing or minimizing friction between the control member and the valve housing.

Figure 1:
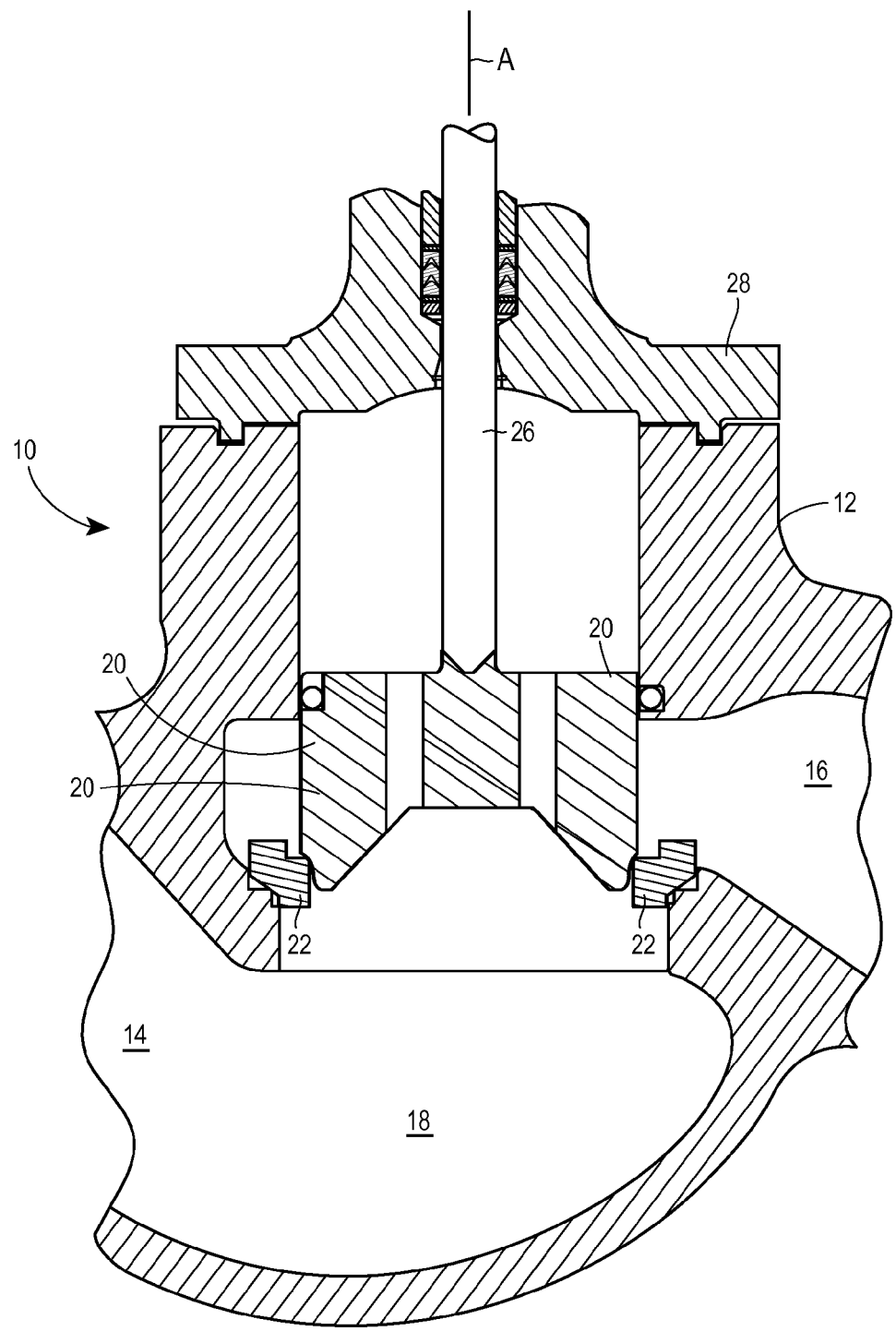
FIG. 1 is a cross-sectional view of sliding stem control valve constructed in accordance with the teachings of the disclosure FIG. 2 close up cross-sectional view of the control element of the sliding stem control valve of FIG. 1, including a composite seal assembly.

While the disclosure is susceptible to various modifications and alternative constructions, certain illustrative embodiments of the composite dynamic valve seal assembly have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION

For purposes of the following discussion, terms such as inwardly, outwardly, radially inwardly or radially outwardly are used to indicate relative position with respect to a center axis A of a valve stem. Similarly, terms such as upper, lower, upwardly, or downwardly are used to indicate relative orientation when the control valve is positioned as shown in the drawings.

Referring now to the drawings, FIG. 1 illustrates a sliding stem control valve 10 assembled in accordance with the teachings of the disclosed example of the present invention and having a valve body 12, a fluid inlet 14, a fluid outlet 16, and a passageway 18 connecting the fluid inlet 14 and the fluid outlet 16. While the control valve is illustrated in FIG. 1 as a sliding stem valve, the teachings of this disclosure may be applied to other types of control valves as well, such as rotary valves, ball valves, globe valves, etc. A control member, such as a valve plug 20, is slidably mounted within the valve body 12 and shiftable between a closed position (as shown in FIG. 1), which prevents fluid flow through the valve body 12, and an open position (not shown), which allows fluid flow through the valve body 12. In the example of FIG. 1, the valve plug is a balanced valve plug 20. In other embodiments, the valve plug may be unbalanced. The valve 10 includes a seat ring 22, which cooperates with the valve plug 20 to control fluid flow through the valve body 12. The control valve 10 also includes a valve stem 26 coupled to the valve plug 20 and extending through a bonnet 28. The valve stem 26 extends along an axis A and is connected to a valve actuator (not shown) for moving the valve plug 20 between the closed position shown in which the valve plug 20 is in contact with the seat ring 22, thereby preventing fluid flow through the passageway 18 and an open position in which the valve plug 20 is spaced away from the seat ring 22, thereby allowing fluid to flow through the passageway 18.

Figure 2:
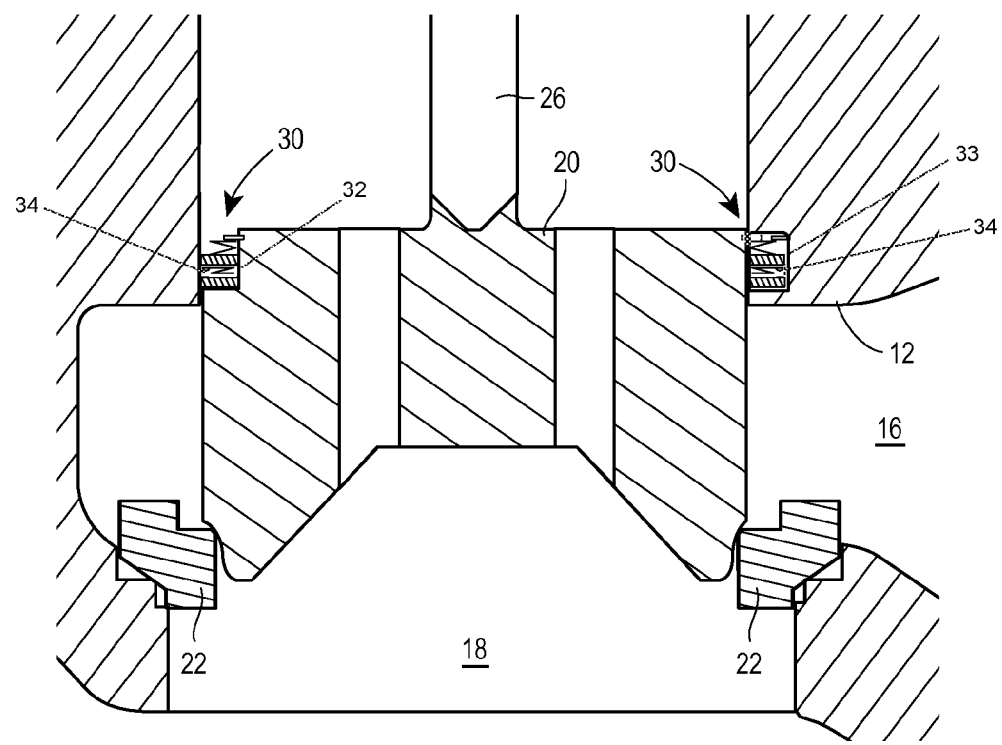
Figure 3:
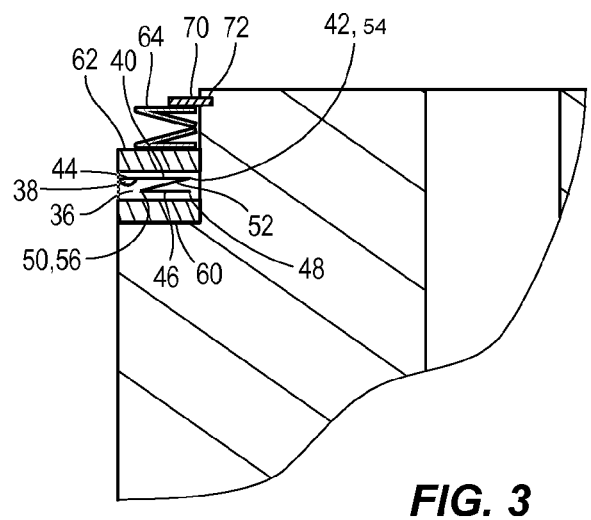
FIG. 3 is a close up cross-sectional view of a portion of the control element including the composite seal assembly.

Referring now to FIGS. 2 and 3, a valve seal assembly 30 is located in an annular recess 32 formed in the valve plug 20, as illustrated on the left side of FIG. 2. Alternatively, the seal assembly 30 may be located in an annular recess 33 formed in the valve body 12, as illustrated on the right side of FIG. 2. Regardless, the seal assembly 30 may include a composite seal ring 34 made of a polytetraflouroethylene (PTFE)/metal mixture. In one embodiment, the composite seal ring 34 may be formed from a PTFE body 36 that includes a metal reinforcing ring 38 (See FIG. 3) embedded within the PTFE body 36. The metal reinforcing ring 38 may be formed of virtually any durable metal, such as S31600 stainless steel, for example. The metal reinforcing ring 38 has a "Z-shaped" cross section. The metal reinforcing ring 38 may include a first portion 40 having a first inner edge 42 and a second outer edge 44 and a second portion 46 having a first inner edge 48 and a second outer edge 50. The first portion 40 and the second portion 46 may be spaced apart from one another and oriented generally perpendicular to the axis A. The first portion 40 and the second portion 46 may be located in parallel planes in one example. A third portion 52 includes a first, inner edge 54 and a second outer edge 56. The inner edge 54 of the third portion 52 is connected to the inner edge 42 of the first portion 40 and the outer edge 56 of the third portion 52 may be connected to the outer edge 50 of the second portion 46, as illustrated in FIG. 3, for example. In other embodiments, the third portion 52 may be reversed so that the outer edge 56 of the third portion is connected to the outer edge 44 of the first portion 40 and the inner edge 54 of the third portion 52 is connected to the inner edge 48 of the second portion 46. Regardless, the metal reinforcing ring 38 transforms axial loads applied to the seal assembly 30 into radial deformation of the composite seal ring 34 to generate a fluid seal between the valve plug 20 and the valve body 18, while the PTFE body 36 lubricates the junction between the valve plug 20 and the valve body 12.

The composite seal ring 34 may be located between a first backup ring 60 and a second backup ring 62. The first and second backup rings 60, 62 may be formed of any hardenable material, such as S41600 stainless steel, for example. The first and second backup rings 60, 62 maintain proper positioning of the composite seal ring 34 within the annular recess 32 as well as providing anti-extrusion protection for the composite seal ring 34. The first and second backup rings 60, 62 also protect the composite seal ring 34 from environmental factors, such as excessive heat and pressure. A biasing element 64, such as a Belleville spring, a spiral wound gasket, or a bolted cap, for example, may be located adjacent the second backup ring 62. The biasing element 64 applies axial force to the second backup ring 62, which is transferred to the composite seal ring 34. The metal reinforcing ring 38 converts the axial force to a radial deformation of the PTFE body 36. The PTFE body 36 expands outwardly (i.e., radially) forming a tight seal against the valve body 12. The outward expansion of the PTFE body 36 also aids in lubricating the junction of the control element 20 and the valve body 12, thus reducing friction during movement of the control element 20. A retainer ring 70 retains the biasing element 64 in position against the second backup ring 62. The retainer ring 70 may be at least partially located in an annular slot 72 formed in the control element 20 or in the valve body 12. The retainer ring 70 prevents the biasing element 64 from becoming separated from the second backup ring 62.

In accordance with one or more of the disclosed examples, a composite seal assembly is provided that provides superior sealing capability, while reducing friction between a control member and a valve body, for high temperature control valves. By forming the composite seal body from PTFE and metal, the composite seal body transforms axial loading into radial deformation, which produces a better seal and simultaneously lubricates the junction between the control element and the valve body.

The foregoing detailed description has been given for clearness of understanding only and no unnecessary limitations should be understood therefrom, as modifications will be obvious to those skilled in the art.

The invention claimed is:

1. A sliding stem control valve comprising:
   a valve body having an inlet and an outlet fluidly connected through a passageway;
   a seat ring mounted in the passageway,
   a control element slidably disposed within the valve body, the control element and the valve seat cooperating to control fluid flow through the valve body; and
   a composite seal assembly having a composite seal ring located between a first backup ring and a second backup ring, a biasing element located adjacent the second backup ring, and a retainer ring holding the biasing element adjacent to the second backup ring,
   wherein the composite seal ring includes a body portion and a metal reinforcing ring embedded within the body portion and wherein the metal reinforcing ring has a Z-shaped cross-section completely embedded within the body portion.

2. The sliding stem control valve of claim 1, wherein the body portion is formed from PTFE.

3. The sliding stem control valve of claim 1, wherein metal reinforcing ring includes a first portion and a second portion that are spaced apart from one another, both the first portion and the second portion being oriented substantially perpendicular to a longitudinal axis of the valve plug.

4. The sliding stem control valve of claim 3, wherein the first portion is a ring having an inner edge and an outer edge, and the second portion is a ring having an inner edge and an outer edge.

5. The sliding stem control valve of claim 3, further comprising a third portion located between the first portion and the second portion, the third portion being non-perpendicular and non-parallel to the first portion and the second portion, the third portion being ring shaped having an inner edge and an outer edge.

6. The sliding stem control valve of claim 5, wherein the inner edge of the third portion is joined to the inner edge of the first portion and an outer edge of the third portion is joined to the outer edge of the second portion.

7. The sliding stem control valve of claim 1, wherein the valve seal assembly is located in an annular recess formed in the valve plug.

8. The sliding stem control valve of claim 1, wherein the valve seal assembly is located in an annular recess formed in the valve body.

9. A composite seal assembly for a high temperature control valve, the composite seal assembly comprising:
a composite seal ring located between a first backup ring and a second backup ring;
a biasing element located adjacent to the second backup ring; and
a retainer ring holding the biasing element against the second backup ring,
wherein the composite seal ring includes a body portion and a metal reinforcing ring embedded within the body portion and wherein the metal reinforcing ring has a Z-shaped cross-section completely embedded within the body portion.

10. The composite seal assembly of claim 9, wherein the body portion is formed from PTFE.

11. The composite seal assembly of claim 9, wherein metal reinforcing ring includes a first portion and a second portion that are spaced apart from one another, both the first portion and the second portion being oriented substantially perpendicular to a longitudinal axis of a valve plug.

12. The composite seal assembly of claim 11, wherein the first portion is a ring having an inner edge and an outer edge, and the second portion is a ring having an inner edge and an outer edge.

13. The composite seal assembly of claim 11, further comprising a third portion located between the first portion and the second portion, the third portion being non-perpendicular and non-parallel to the first portion and the second portion, the third portion being ring shaped having an inner edge and an outer edge.

14. The composite seal assembly of claim 13, wherein the inner edge of the third portion is joined to the inner edge of the first portion and an outer edge of the third portion is joined to the outer edge of the second portion.

15. The composite seal assembly of claim 9, wherein the metal reinforcing ring is made from S31600 stainless steel.

16. The composite seal assembly of claim 9, wherein the at least one backup ring is made from S41600 stainless steel.

* * * * *